United States Patent [19]

Futamura et al.

[11] Patent Number: 4,973,615

[45] Date of Patent: Nov. 27, 1990

[54] BITUMINOUS COMPOSITIONS

[75] Inventors: Shingo Futamura, Wadsworth; James O. Tveekrem, Akron, both of Ohio

[73] Assignee: Bridgestone/Firestone, Inc., Akron, Ohio

[21] Appl. No.: 477,003

[22] Filed: Feb. 7, 1990

Related U.S. Application Data

[63] Continuation of Ser. No. 369,782, Jun. 22, 1989, abandoned, which is a continuation of Ser. No. 160,445, Feb. 25, 1988, abandoned.

[51] Int. Cl.$^5$ .................... C08L 53/02; C08L 95/00
[52] U.S. Cl. .................................. 524/66; 524/68; 524/70; 524/71
[58] Field of Search ..................... 524/66, 68

[56] References Cited

U.S. PATENT DOCUMENTS

| | | |
|---|---|---|
| 3,978,014 | 8/1976 | van Beem et al. . |
| 4,102,849 | 7/1978 | Bouton et al. . |
| 4,282,127 | 8/1981 | Desgouilles . |
| 4,361,672 | 11/1982 | Agarwal et al. . |
| 4,419,469 | 12/1983 | Bohm et al. . |
| 4,835,199 | 5/1989 | Futamura et al. . |

*Primary Examiner*—John C. Bleutge
*Assistant Examiner*—David W. Woodward
*Attorney, Agent, or Firm*—Frank J. Troy, Sr.

[57] ABSTRACT

A bituminous composition comprising a blend of bitumen, a polyolefin and a thermoplastic elastomer containing at least two polymer blocks wherein one of said polymer blocks is a crystalline polymer block and one of said polymer blocks is an amorphous polymer block is provided.

The bituminous compositions of the invention have excellent low temperature flexibility and high temperature creep resistance properties and are particularly useful as a roof coating or waterproofing material or a road paving material.

11 Claims, No Drawings

BITUMINOUS COMPOSITIONS

This application is a continuation of application Ser. No. 369,782, filed 6/22/89, which is a continuation of 160,445 filed 2/25/88, both now abandoned.

BACKGROUND OF THE INVENTION

The invention relates to a bituminous composition comprising a blend of bitumen, a polyolefin and a thermoplastic elastomer. More particularly, the invention relates to a bituminous composition comprising a blend of bitumen, a polyolefin and a thermoplastic elastomer containing at least two polymer blocks wherein one of said polymer blocks is a crystalline polymer block having a Tm above 40° C. and one of said polymer blocks is an amorphous polymer block having a Tg of 0° C. or lower.

Bituminous materials especially asphalt have long been utilized in roofing materials particularly in built up roofing (i.e. BUR) application, as road paving materials and as adhesive materials. Unfortunately, however, such materials tend to deteriorate under conditions of extreme temperature variations, constant exposure to physical stress and environmental weathering.

In order to overcome the deficiencies of these bituminous materials particularly asphalt, those active in this field have proposed blending various polymers particularly polyolefins and elastomeric polymers with the asphalt.

However, polyolefin modified asphalts suffer from a number of significant disadvantages which materially limit their usefulness. Thus, the polyolefins tend to stiffen the resulting composition which often results in poor low temperature flexibility and low elongations at break which in turn causes the material to become brittle upon exposure to low temperatures and consequently subject to cracking. Moreover, the polyolefin modified asphalts generally have high softening points, e.g. 140° to 150° C., which prevents them from being seamed or adhered to the roof surface by means of the so-called "hot mopping" procedure. In that procedure, the roof surface is mopped with hot asphalt as a roll or sheet of polymer modified asphalt is being applied to the roof. When using the hot mopping procedure, it is necessary that the polymer modified asphalt soften when brought into contact with the hot asphalt in order to produce a strong bond to the roof surface. However, in the case of polyolefin modified asphalts this does not occur because of the materials high softening point. Accordingly, in order to adhere polyolefin modified asphalts to the roof surface, it is necessary to utilize a torching procedure in which a propane torch is used to soften the surface of the modified asphalt as it is being applied to the roof surface. As will be evident, such a torching procedure is both cumbersome and time consuming. Additionally, polyolefins have only very limited compatability with asphalt and as a consequence the resulting composition upon exposure to heat tends to undergo phase separation into a hard asphaltene rich phase and a softer polyolefin rich phase; a situation which results in the composition having lower than desirable properties.

Unsaturated elastomers or elastomeric polymers such as polybutadiene and random butadiene-styrene copolymers have also been blended with asphalt. However, it has been found that in addition to deficiencies in dimensional stability such unsaturated polymers are susceptible to oxidation particularly when exposed to high temperatures and as a result lose many of their desirable properties such as flexibility and strength.

More recently, those active in the bituminous material field have proposed blending hydrogenated butadiene-styrene random copolymers, butadiene-styrene block copolymers and hydrogenated butadiene-styrene block copolymers with asphalt as shown by the following patents:

U.S. Pat. No. 3,856,732 to Bresson et al., relates to a modified asphalt hydraulic sealer which comprises a cut back asphalt and a small amount (e.g. 1 to 10%) of a butadiene-styrene block copolymer of the SBS type, a hydrogenated random butadiene-styrene copolymer or mixtures thereof or an ethylene-vinyl acetate copolymer.

U.S. Pat. No. 3,978,014, to Van Beem et al., relates to bituminous compositions comprising: (a) 95%–75% by weight of a bituminous component Q having an aromaticity exceeding $0.004 \times P + 0.280$ in which P is the N-heptane asphaltene content, (b) 4%–15% by weight of a block copolymer, $M_1$, preferably a polystyrene-polyalkadiene-polystyrene; and (c) 4%–15% by weight of a thermoplastic polymer, $M_2$, different from $M_1$ and which has a molecular weight above 10,000, a solubility parameter of 7.8–8.8 and a crystallinity below 60% at 25° C. The patent discloses at column 1, lines 46–55 and column 2, lines 48–57 that the block copolymer, $M_1$ is of the general formula A-B-A in which the A's represent the same or different thermoplastic non-elastomeric polymer blocks prepared by polymerization of one or more monoalkenyl aromatics and in which B represents an elastomeric polymer block prepared either by polymerization of one or more conjugated alkadienes or by copolymerization of one or more conjugated alkadienes with one or more monovinyl aromatics. At column 1, lines 53–55, the patent further discloses that polymer block B may be completely or partly hydrogenated, if desired.

U.S. Pat. No. 4,032,491 to Schoenke relates to a roofing composition for producing a roofing membrane having good bond strength, resistance to cracking, tensile strength and hardness, comprising 5%–40% of asphalt and 60%–95% of a block copolymer of the A-B-A type in which each end block A is formed from a vinyl aromatic monomer and midblock B is a hydrogenated polydiene or a polymer of the ethylene/propylene or ethylene/butylene type. As will be evident, the roofing composition of this patent is basically a block copolymer based composition rather than an asphalt based composition.

U.S. Pat. No. 4,102,849 to Bouton et al., relates to oil-extended hydrogenated diblock copolymers comprising 10–200 parts of oil per 100 parts of a hydrogenated diblock copolymer comprising one block of polybutadiene and one block of a random copolymer of a vinyl arene, such as styrene, and butadiene. The patent, at column 6 lines 53–58, states that the oil-extended hydrogenated diblock copolymers may be utilized for a wide variety of molding operations particularly for rubber hose, shoe soles, tires, industrial and automotive goods, etc. The patent, at column 6 lines 63–68; further discloses that the oil-extended hydrogenated diblock copolymers may be modified by the presence of asphalt, wax, polyvinyl compounds such as polystyrene, ordinary polymers of alpha-olefins such as polypropylene or polyethylene or may be mixed with either natural or synthetic rubbers such as polyisoprene and polybutadiene. This patent also appears to be a block copolymer based composition rather than a bitumen- or asphalt-based composition.

U.S. Pat. No. 4,196,115 to Bresson relates to bituminous or asphalt-based roofing or waterproofing compositions having desirable high and low temperature properties which comprise bitumen or asphalt, at least one radial conjugated diene/monovinyl aromatic copolymer having a weight average molecular weight (Mw) of above 200,000 and a conjugated diene/monovinyl aromatic ratio of 50/50 to 85/15 and at least another or second type radial or linear conjugated diene/monovinyl aromatic copolymer having an Mw of below 200,000 and having the same ratios of conjugated diene/vinyl aromatic. As disclosed in the patent, the conjugated diene/vinyl aromatic copolymers are block copolymers represented by the formula $(A-B-A)_xY$ or $(A-B)_xY$ wherein A represents a non-elastomeric poly(monovinyl aromatic) block containing 8-18 carbon atoms per molecule, and B represents an elastomeric poly (conjugated diene) block containing 4-12 carbon atoms per molecule, Y is at least one atom derived from a polyfunctional treating agent and x represents the number of functional groups of said polyfunctional treating agent and is an integer equal to at least 3.

U.S. Pat. No. 4,610,902 to Eastman et al., relates to a laminate composition useful as a roofing membrane comprising a top and a bottom layer of plastic film bonded together by a modified bitumen material, the top layer of said laminate either containing or being surface coated with an ultraviolet light resistant and absorbing agent. As set forth in the patent, the modified bitumen material is formed by blending a thermoplastic elastomer or thermoplastic rubber or a polyurethane into the bitumen. Thermoplastic elastomers or thermoplastic rubbers disclosed in the patent are styrene-butadiene-styrene (SBS), styrene-isoprene-styrene (SIS) and styrene-ethylene-butylenestyrene (SEBS) block copolymers.

Bituminous compositions comprising bitumen, an elastomer and a polyolefin have also been proposed as shown by the following patents:

U.S. Pat. No. 4,282,127, to Desgouilles, relates to a bitumen - based composition comprising a ternary mixture of (a) 52-78 weight % of bitumen, (b) 20-40 weight % polyolefin and (c) 2-8 weight % of a butadiene-styrene copolymer. As set forth in the patent, the butadiene-styrene copolymer may be a random copolymer or a block copolymer with triblock styrene-butadiene-styrene copolymers being particularly suitable.

U.S. Pat. No. 4,659,759 to Jevanoff et al. relates to a bituminous composition which comprises bitumen and a modifier comprising a polyolefin component and an elastomeric component. According to the patent, the polyolefin component contains polyethylene and polypropylene and the elastomeric component comprises an ethylene-propylene copolymer having a broad compositional distribution with regards to its ethylene content.

Bituminous compositions which have been modified with unsaturated elastomers or elastomeric polymers such as polybutadiene, random butadiene-styrene copolymers or block copolymers of the SBS type as described in several of the aforementioned patents exhibit a number of desirable properties including good low temperature flexibility and high temperature creep resistance properties. However, such compositions exhibit the significant disadvantage that the unsaturated polymers utilized therein are susceptible to oxidation upon exposure to high temperatures which results in deterioration and loss of their desirable properties such as flexibility and strength. Moreover, bituminous compositions modified with SBS block copolymers often vary in properties and compatibility or homogeneity depending upon the nature and type of bitumen which is blended with the SBS block copolymer.

Bituminous compositions which have been modified with hydrogenated random copolymers of butadiene and styrene and hydrogenated SBS type block copolymers as described in several of the above patents exhibit a number of desirable properties including good low temperature flexibility and high temperature creep resistance properties. However, such compositions also have certain disadvantages. Thus, such compositions are generally deficient in solvent resistance. Moreover, bituminous compositions modified with hydrogenated SBS block copolymers often vary in properties and compatibility or homogeneity depending upon the nature and type of bitumen which is blended with the hydrogenated SBS block copolymer.

Accordingly, there remains a need for bituminous compositions which provide a combination of desirable properties including good low temperature and high temperature properties, weathering resistance, dimensional stability, solvent resistance, uniformity of properties and homogeneity.

SUMMARY OF THE INVENTION

In accordance with the present invention, a bituminous composition having such a desirable combination of properties is provided. The composition comprises a blend of: (a) from about 40% to about 98% by weight of bitumen; (b) from about 1% to about 30% by weight of a polyolefin and (c) from about 1% to about 30% by weight of a thermoplastic elastomer containing at least two polymer blocks, wherein one of said polymer blocks is a crystalline polymer block having Tm above 40° C. and one of said polymer blocks is an amorphous polymer block having a Tg of 0° C. or lower, and wherein the weight ratio of crystalline polymer block to amorphous polymer block is within the range of from 10:90 to 80:20.

In addition to the other advantageous properties discussed above, it has been further found that the compositions of the invention can be adhered to the desired substrate either by mopping with hot asphalt or by torching.

DETAILED DESCRIPTION OF THE INVENTION

The term "bitumen" can generally be defined as mixtures of hydrocarbons of natural or pyrogenous origin or combinations of both, frequently accompanied by their non-metallic derivatives, which may be gaseous, liquid, semi-solid or solid, and which are usually soluble in carbon disulfide. For the purposes of the present invention, bitumen of a liquid, semi-solid or solid nature may be utilized. From a commercial standpoint, bitumen is generally restricted to asphalts and tars and pitches. A listing of various bituminous materials which may be utilized in the present invention include the following:

I. Asphalts

1. Petroleum Asphalts

A. Straight-reduced asphalts

1. Atmospheric or reduced-pressure reduction
2. Solvent precipitated, as with propane
B. Thermal asphalts, as residues from cracking operations on petroleum stocks
C. Air-blown asphalts
1. Straight-blown
2. "Catalytic"-blown 2. Native Asphalts A. With mineral content below 5%
1. Asphaltites such as gilsonite, graphamite, and glance pitch
2. Bermudez and other natural deposits
B. With mineral content over 5%
1. Rock asphalts
2. Trinidad and other natural deposits II. Tars and Derivatives 1. Residua from coke-oven-derived coal tars A. Coal tars reduced to float grades, as RT (road tar) grades for paving purposes
B. Coal-tar pitches, with reduction carried out to softening-point grades
2. Residua from other pyrogenous distillates as from water-gas, wood, peat, bone, shale, rosin, and fatty acid tars.

As can be readily appreciated by those skilled in the art, the weight average molecular weight of the various bitumens can vary over a very wide range, for example such as from about 500 to about 10,000. Additionally, the softening point of the various types of asphalt will also vary such as from about 30° F. to about 400° F. The preferred asphalts herein are those having asphaltene contents of less than 25%.

Of the many types of asphalts which may be utilized, petroleum and native are desired, with petroleum being preferred. Of the petroleum asphalts, the thermal asphalts are preferred.

The amount of bitumen utilized in the compositions of the invention may range from about 40% to about 98% by weight based on total weight of composition with preferred amounts ranging from about 70% to about 97% by weight.

The polyolefin component of the compositions of the invention is a 1-olefin polymer such as polyethylene or polypropylene. The polyethylene used in the composition is of isotactic configuration while the polypropylene may be of isotactic or atactic configuration. The preferred polyolefin is atactic polypropylene.

The amount of polyolefin utilized in the compositions of the invention may range from about 1% to about 30% by weight based on total weight of composition with preferred amounts ranging from about 2% to about 20% by weight.

As indicated above, the thermoplastic elastomer component of the compositions of the invention is a thermoplastic elastomer containing at least two polymer blocks, wherein one of said polymer blocks is a crystalline polymer block having a Tm (i.e. melting point) above 40° C. and one of said polymer blocks is an amorphous polymer block having a Tg of 0° C. or lower and wherein the weight ratio of crystalline polymer block to amorphous polymer block is within the range of from 10:90 to 80:20. A preferred thermoplastic elastomer of this type is one in which the crystalline polymer block has a Tm of from 60° to 165° C., the amorphous polymer block has a Tg of from $-15°$ to $-100°$ C. and the weight ratio of crystalline polymer block to amorphous polymer block is within the range of from 15:85 to 60:40. A particularly preferred thermoplastic elastomer is one in which the crystalline polymer block has a Tm of 70° to 140° C., the amorphous polymer block has a Tg of below $-20°$ C. and the weight ratio of crystalline polymer block to amorphous polymer block is within the range of from 25:75 to 50:50.

In general, any thermoplastic elastomer having the above characteristics may be utilized in the compositions of the invention. However, the preferred thermoplastic elastomers are block copolymers in which the crystalline polymer block is a hydrogenated block of polybutadiene and the amorphous polymer block is a hydrogenated block of a random copolymer of a vinyl arene (e.g. styrene) and 1,3-butadiene. It should be noted that while the preferred crystalline polymer block is a hydrogenated block of polybutadiene, this polymer block may also include small amounts (up to 20%) of a vinyl arene monomer or other monomers which are copolymerizable with 1,3-butadiene so long as this polymer block meets the above limitations. Moreover, other amorphous polymer blocks may be utilized instead of the preferred hydrogenated block of random copolymer. Thus, other amorphous polymer blocks may be employed including a hydrogenated block of a polybutadiene having a 1,2-microstructure content of from 35-90% prior to hydrogenation, a hydrogenated block of polyisoprene, a hydrogenated block of an isoprene/butadiene copolymer and the like. It should further be understood that these block copolymers may contain other polymer blocks in addition to the above hydrogenated blocks provided that they do not adversely affect the desired properties of the block copolymer.

The particularly preferred thermoplastic elastomers for use in the compositions herein are hydrogenated diblock copolymers of the type described in U.S. Pat. No. 4,102,849, the disclosure of which is incorporated herein by reference. Especially preferred hydrogenated diblock copolymers of that type are those containing from 20%-70% by weight of a hydrogenated block of a polybutadiene having a 1,2-microstructure content of less than 30% prior to hydrogenation and from 30%-80% by weight of a hydrogenated block of a random copolymer of a vinyl arene (e.g. styrene) and 1,3-butadiene containing from 5%-50% by weight of vinyl arene and 50%-95% by weight of butadiene with the butadiene portion of the random copolymer having a 1,2-microstructure content of 5%-80% prior to hydrogenation. These hydrogenated diblock copolymers have an average molecular weight of 15,000-1,000,000, preferably 20,000-500,000, as determined by viscosity measurement and a residual aliphatic unsaturation content of less than 20%, preferably less than 10%, of the original aliphatic unsaturation content prior to hydrogenation.

The hydrogenated diblock copolymers may be prepared in known manner by first preparing the non-hydrogenated diblock copolymer using known block copolymer polymerization processes and then hydrogenating the resultant diblock copolymer using known hydrogenation processes and hydrogenation catalysts. Thus, in preparing the non-hydrogenated diblock copolymer, various polymerization methods known in the art may be utilized. Preferably, the polybutadiene block is formed first and then, without deactivating the polymerization initiator, the random copolymer block is formed directly thereon. Alternatively, however, the random copolymer block may be formed first and then, without deactivating the polymerization initiator, the polybutadiene block may be formed directly thereon.

Vinyl arenes which may be employed in preparing the random copolymer block of the diblock copolymer include any vinyl or alpha-methyl vinyl arene compounds which are capable of being polymerized by an anionic initiator. Suitable vinyl arenes of that type include styrene, alphamethyl styrene, vinyl toluene, vinyl naphthalene and the like. The preferred vinyl arene is styrene.

The polybutadiene block of the diblock copolymer is generally prepared by polymerizing 1,3-butadiene in the presence of an organolithium initiator in an inert liquid hydrocarbon medium.

Organolithium initiators which may be employed are compounds having the formula R Li, wherein R is an aliphatic, cycloaliphatic or aromatic hydrocarbon radical containing from 1 to 20 carbon atoms. Suitable organolithium compounds include among others methyllithium, ethyllithium, isopropyllithium, n-butyllithium, sec-butyllithium, t-butyllithium, hexyllithium, n-decyllithium, cyclohexyllithium, phenyllithium, p-tolyllithium and the like. The preferred organolithium compounds are alkyllithium compounds containing from 1 to 8 carbon atoms in the alkyl radical and of these n-butyllithium is particularly preferred.

The inert liquid hydrocarbon employed as the polymerization medium is advantageously an aliphatic hydrocarbon having 4–10 carbon atoms or an aromatic hydrocarbon having 6–10 carbon atoms which is inert to the polymerization initiator employed. The liquid hydrocarbon may be one in which the polymer is soluble or partly soluble or in which the polymer is suspended. Suitable liquid hydrocarbons include pentanes, hexanes, heptanes, cyclohexane, benzene and toluene with hexanes and cyclohexanes being preferred. Mixtures of these liquid hydrocarbons may also be utilized.

From 200 to 900 parts by weight of liquid hydrocarbon per 100 parts of monomer is generally sufficient to yield a fluid polymer solution or suspension which can be easily handled.

The temperature of the polymerization mass should be maintained between 0° and 175° C., preferably 50°–150° C.

Polymerization is advantageously performed in an agitated, pressurized reactor which may be jacketed to allow for temperature control. Pressures are generally autogenous, although inert gases can be charged to the reactor to increase the pressure, if desired. Dry nitrogen, argon, helium or other inert gas can be used for this purpose. Normally pressures will be atmospheric or above, and can be as high as 10 atmospheres or more.

In one method of forming the random copolymer block, a styrene-butadiene monomer mixture in the desired ratio is fed into the reactor at such a rate that as the butadiene is continuously consumed the styrene is also copolymerized in a random repeating unit arrangement. This polymerization rate is affected by a number of factors, including the temperature, the solvent or diluent, the ratio of styrene to butadiene, the specific type of catalyst used, and the concentration of catalyst. It is also very important to have very efficient agitation to provide homogeneity and intimate contact of the various components.

When the monomer mixture feed rate is maintained slow enough to maintain a low instantaneous monomer concentration (starved condition), random copolymerization is effected. Random copolymerization may also be assured by adding all of the styrene initially to the polymerization system containing the polybutadiene block in the form of polybutadiene-Li and then adding the butadiene gradually at about or less than the rate at which it is being polymerized. Then with the system being maintained deficient in butadiene because it is being polymerized as fast as it is being fed into the system, the styrene is copolymerized to form the random copolymer block. After the butadiene is all added and polymerized, the remaining styrene monomer is swept from or otherwise removed from the system to avoid the formation of a terminal block of polystyrene. If the amount of styrene remaining is small, it may be polymerized since a very small terminal block of polystyrene will not be harmful. Up to 10% block polystyrene may be tolerated in the copolymer without harmful effects on the properties, and preferably there is no more than 5%. In another method of forming a random copolymer, a randomizer such as ether or an amine can be added to the polymerization system to promote random polymerization of butadiene and styrene.

The microstructure of the butadiene block in the basic non-hydrogenated polymer is important because it influences the properties of the resulting fully hydrogenated block copolymers. For example, block sequences derived from butadiene polymerized by 1,4 addition yield, upon hydrogenation, unsubstituted polyethylene sequences. Those units which enter the polymeric block via 1,2 addition polymerization yield ethyl-substituted ethylene units upon hydrogenation.

The 1,2 content is advantageously below 30%, preferably below 20%.

The hydrogenation of the diene-vinyl arene diblock copolymer may be carried out by a variety of methods. The hydrogenation may be effected by placing the diblock copolymer in a hydrocarbon solution in the presence of a suitable catalyst and applying hydrogen gas under pressure to this solution. The method may be either continuous or a batch process.

The diblock polymer concentration may vary between about 0.5% to about 50% by weight of the hydrocarbon solution and preferably within a range of about 2% to about 35%.

Suitable solvents include saturated cyclic hydrocarbons, such as cyclohexane, methylcyclohexane, decalin, and the like. Aromatic hydrocarbons, such as benzene and toluene; and paraffinic hydrocarbons such as isooctanes, isoheptanes, and normal heptane, hexane, pentane and the like; hydroaromatic hydrocarbons such as tetralin and the like, can also be used. Mixtures of solvents and/or dispersants can be used if desired.

In one embodiment, after the polymer has been dissolved in the solvent, the hydrogenation catalyst is added, hydrogen is added, and the temperature raised to a suitable level to initiate the reaction. Either the catalyst or the solution of polymer can be added in increments after the reaction temperature has been reached. This operation can be carried out in a batch-wise or a continuous process. When sufficient hydrogenation has been effected, usually indicated by a decrease in unsaturation or a drop in hydrogen pressure, the reaction is stopped and the dispersion or solution treated by suitable means, to deactivate or to remove the catalyst.

In the hydrogenation step, any catalyst known in the prior art may be used which is capable of converting aliphatic unsaturatation to saturated product. Thus, the well known Raney nickel or nickel kieselguhr catalyst may be utilized. However, when using such catalysts, it is generally necessary to utilize a large amount of catalyst, a high reaction temperature (e.g. 150° to 200° C. or higher) and a high hydrogen pressure. Such high temperature hydrogenation condition can result in polymer degradation unless careful control of the hydrogenation process is exercised. Accordingly, it is desirable to employ a hydrogenation catalyst which permits the use of milder hydrogenation temperatures and pressures.

A preferred hydrogenation catalyst system for preparing the hydrogenated diblock copolymers of the compositions of the invention is disclosed in British Patent No. 1,184,120, the disclosure of which is incorporated herein by reference. As described in the aforementioned patent, suitable catalysts for that purpose are prepared by mixing an organic compound of a metal selected from the group consisting of nickel, cobalt and iron with an organometallic compound of a metal selected from Groups I, II and III of the Periodic Table of the Elements. Such catalysts have the advantage that they are soluble in the solution copolymer and permit selective hydrogenation of diene units in a viscous solution under relatively mild conditions such as for example near room temperature and under atmospheric pressure of hydrogen.

Among the organic compounds of nickel, cobalt or iron, one of the preferred compounds is a metal carboxylate. The metal carboxylates include nickel naphthenate, cobalt naphthenate, iron naphthenate, nickel octoate, and cobalt octoate. Another preferred compound is a metal chelate compound. As the chelating groups, beta-diketones, beta-hydroxycarbonyl compounds, and 8-hydroxyquinoline may be used. The metal chelate compounds include bis (acetylacetone) nickel, tris(acetylacetone) cobalt, bis(ethyl acetoacetate) nickel, bis(salicylaldehyde) nickel, bis (8-hydroxquinoline) nickel, tris (8-hydroxyquinoline)-cobalt, and bis(3,5-diisopropylsalicylic acid)-nickel. The preferred organic compounds are nickel compounds and of these nickel octoate is especially preferred.

Among the organometallic compounds of the metals of Group I, II or III, a metal hydrocarbyl compound of lithium, magnesium or aluminium is preferably used. Examples of such metal hydrocarbyl compounds include n-butyllithium, diethylmagnesium, triethylaluminium, triisobutylaluminium, triamylaluminium, and diethylisobutylaluminium. In addition to the organometallic compound, the metal hydrides such as lithium aluminium hydride and sodium borohydride may be used. The preferred organometallic compounds are organoaluminium compounds and of these triethylaluminium is especially preferred.

Further, besides the above mentioned two component catalysts, a three component soluble catalyst consisting of the above mentioned two catalytic components and an olefinically or acetylenically unsaturated hydrocarbon is also preferably used. The soluble catalyst consisting of the above mentioned two or three catalytic components is easily removed from the hydrogenated copolymer by adding polar solvent such as acetone and alcohol to the reaction mixture containing the hydrogenated copolymer and precipitating the polymer. To make the removal of the catalyst residue more effective, it is preferable to contact the reaction mixture with polar solvent or water containing a small amount of acid. The catalysts used for preparing the hydrogenated copolymer used in the present invention are not limited to the above mentioned soluble catalyst. Other catalysts which can effect the selective hydrogenation of diene units of high molecular weight copolymers without degradation or gelation may be used.

The amount of catalyst used in hydrogenating the diblock copolymers is dependent upon factors such as the particular type catalyst employed, the hydrogenation temperature and pressure and the like. When using the preferred nickel compounds, the quantity of catalyst may be varied within a range of from about 0.05 millimoles to 10 millimoles of nickel per 100 grams of polymer. In commercial applications, it is desirable to limit the residence time of hydrogenation and this may be achieved by using high catalyst to polymer ratios.

The diblock copolymers can be hydrogenated using the following ranges of reaction conditions. The concentration of copolymers to be hydrogenated may be from 0.5 to 50%, preferably from 2 to 35% by weight. Excellent hydrogenation efficiency is obtained by hydrogenation of a solution containing 10–20% of the block copolymers carried out at room temperature to 350° C., or even higher, preferably room temperature to 150° C., under hydrogen pressure from 1 atmosphere to 100 atmospheres, preferably 2–20 atmospheres. Reaction periods in the range of 0.5 to 24 hours, preferably 2 to 8 hours, can be employed.

In order to obtain polymers of the desired characteristics, the aliphatic unsaturation should be reduced to a value of approximately 0% to 20%, based upon the theoretical value of 100% for the unhydrogenated butadiene polymer. Preferably the residual aliphatic unsaturation in the products should be less than 10%.

The viscosities used to determine the molecular weight of the hydrogenated diblock copolymer are dilute solution viscosities (DSV). The dilute solution viscosity is defined as the inherent viscosity determined at 25° C. on a 0.4% solution of the polymer in toluene. The hydrogenated diblock copolymers employed in the compositions of the invention have DSV's ranging from 0.3 to 6.5, preferably 0.37 to 4.0, which corresponds to average molecular weights of from about 15,000 to 1,000,000, preferably from about 20,000 to about 500,000.

A more detailed description of processes for preparing the hydrogenated diblock copolymers used in the compositions of the invention may be found in U.S. Pat. No. 4,102,849, the disclosure of which has been incorporated herein by reference.

The compositions of the invention may contain from about 1% to about 30%, preferably from 2% to 15% by weight of the thermoplastic elastomer based upon total weight of composition.

The bituminous material can be blended with the polyolefin and thermoplastic elastomer by any of the well known methods for blending asphalt materials with various rubbers. A preferred method of mixing the thermoplastic elastomer and polyolefin with bitumen is to stir the elastomer and polyolefin into preheated bitumen using high shear mixing equipment which will grind the elastomer and polyolefin into small particles as they are being dispersed into the hot bitumen.

In the examples which follow, certain of the bituminous compositions were evaluated for hot mopped seam strength and compatibility.

Hot mopped seam strength of the compositions was determined in accordance with the following procedure:

Two 3" wide×3½" long slabs of fabric reinforced test material (i.e., polymer modified asphalt) were prepared. A 1" wide strip along the 3" width of one of the slabs was coated with hot asphalt (i.e., hot mopped). Then, the 3" wide portion of the second slab was manually applied to the first slab end to end so as to overlap the 1" asphalt coated portion of the first slab. The resultant slab about 3" wide×5" long was then rolled with a hand roller and allowed to cool to room temperature. The slab was then cut into 1" wide×5" long adhesion test strips. The test strips were tested for seam strength (i.e., shear adhesion) using an Instron testing machine. Adhesion test results are reported in pounds per square inch (psi).

Compatibility of the composition was determined in accordance with the following procedure:

A sample of bituminous composition was placed in a tall tin can and covered. The sample was then heated for five (5) days at 350° F. in an oven. Subsequently, the sample was allowed to cool. The can was then cut away to permit visual observation of the sample. If the composition lacked compatibility it separated into two (2) phases or layers; a top layer rich in polymer and a hard, shiny bottom layer rich in asphaltenes. The compatibility as determined by percent hard phase was determined by measuring the height of the bottom layer relative to the total height of the sample.

The following examples are submitted for the purpose of further illustrating the nature of the present invention and are not to be considered as a limitation on the scope thereof. Parts and percentages shown in the examples are by weight unless otherwise indicated.

Examples 1-2

These examples illustrate bituminous compositions of the invention formed by blending asphalt, high density polyethylene and a thermoplastic elastomer comprising a hydrogenated block of polybutadiene and a hydrogenated block of a random butadiene/styrene copolymer (hereinafter designated $H_2Bd$-Bd/S for convenience). For comparative purposes, a bituminuous composition prepared by blending asphalt and the thermoplastic elastomer was included to serve as a control (designated C for convenience). The compositions were evaluated for Ring and Ball softening point (R&B), verticle flow temperature and low temperature bend failure. Composition formulations and test results are shown in Table I.

TABLE I

| Example | C | 1 | 2 |
|---|---|---|---|
| Ingredients (wt %) | | | |
| Asphalt[1] | 83.8 | 81.8 | 79.8 |
| $H_2Bd$-Bd/S[2] | 11.4 | 11.1 | 10.9 |
| High density PE[3] | — | 2.4 | 4.8 |
| Paraffinic oil | 4.8 | 4.7 | 4.5 |
| Composition Properties | | | |
| R&B, °C.[4] | 97 | 110 | 116 |
| Vertical hot flow temperature, °C.[5] | 100 | 115 | N.D.* |
| Low temperature 180° bend failure, °C.[6] | −25 | −22.5 | −25 |

*N.D. = not determined
[1]Petroleum asphalt AC-20 grade available from Trumbull, a division of Owens-Corning Fiberglass.
[2]A hydrogenated diblock copolymer containing 35% by weight of a hydrogenated block of polybutadiene having 1,2-microstructure content of 13% prior to hydrogenation and 65% by weight of a hydrogenated block of a random copolymer of butadiene/styrene containing 62.5% of butadiene and 37.5% of styrene with the butadiene portion of the random copolymer having a 1,2-microstructure content of 15% prior to hydrogenation. The diblock copolymer has a molecular weight, Mn, of 81,000, a residual aliphatic unsaturation content of <1.0%, a melt index (MI) of 2.5, Tm of 100° C. and heat of fusion of 40 J/g.
[3]a high density polyethylene having MI of 40 and density of .951 g/cc, available from Union Cardide.
[4]Ring and Ball softening point determined in accordance with ASTM D36-76.
[5]Conducted in accordance with modified DIN52123-13.
[6]Conducted in accordance with modified DIN52123-12. As indicated by these tests, the bituminous compositions of the invention have good high temperature dimensional stability and low temperature flexibility.

As indicated by these tests, the bituminous compositions of the invention have good high temperature dimensional stability and low temperature flexibility.

Example 3

This example illustrates a bituminous composition of the invention in which atactic polypropylene (APP) was used as the polyolefin component. For comparative purposes, a bituminous composition formed by blending asphalt with APP (designated $C_1$ for convenience) and a bituminous composition formed by blending asphalt with $H_2Bd$-Bd/S thermoplastic elastomer (designated $C_2$) were included to serve as controls. The compositions were tested for various properties. Composition formulations, tests and test results are shown in Table II.

TABLE II

| Example | $C_1$ | $C_2$ | 3 |
|---|---|---|---|
| Ingredients | | | |
| Asphalt[1] | 70.0 | 88.0 | 79.0 |
| APP[2] | 30.0 | — | 15.0 |
| $H_2Bd$-Bd/S[3] | — | 12.0 | 6.0 |
| Composition Properties | | | |
| Viscosity at 180° C. (cp)[4] | 900 | 8475 | 3525 |
| Vertical hot flow (°C.) | 150 | 95 | 105 |
| R&B, °C. | 142 | 98 | 108 |
| Low temperature 180° bend failure, ° C. | −12.5 | −22.5 | −17.5 |
| Penetration at 25° C. (dmm)[5] | 42 | 25 | 30 |
| Max stress (psi) | 100 | 96 | 45 |
| Elongation at break, (%) | 125 | >1100 | 710 |
| Hot mopped seam strength, shear adhesion (psi) | 20 | >50 | 53 |
| Compatibility after 5 days at 350° F. (% hard phase) | 27 | 0 | 7 |

[1]Same as in Examples 1 and 2.
[2]An atactic polypropylene from Texas Eastman Company, type M5H.
[3]Same as in Examples 1 and 2.
[4]cp = centipoises.
[5]dmm = decimillimeter

We claim:

1. A bituminous composition comprising a blend of:
   (a) from about 40% to about 98% by weight of bitumen;
   (b) from about 1% to about 30% by weight of a polyolefin; and
   (c) from about 1% to about 30% by weight of a thermoplastic elastomer containing at least two polymer blocks, wherein one of said polymer blocks is a crystalline polymer block of a hydrogenated polybutadiene having a Tm above 40° C. and one of said polymer blocks is an amorphous polymer block of a hydrogenated random copolymer of vinyl arene and 1,3-butadiene having a Tg of 0° C. or lower and wherein the weight ratio of crystalline polymer block to amorphous polymer block is within the range of from 10:90 to 80:20.

2. The composition of claim 1 wherein said bitumen is a petroleum based asphalt.

3. The composition of claim 1 wherein said bitumen is coal tar.

4. The composition of claim 1 wherein said polyolefin is selected from the group consisting of isotactic polyethylene, isotactic polypropylene and atactic polypropylene.

5. The composition of claim 1 wherein said polyolefin is atactic polypropylene.

6. The composition of claim 1 wherein said polyolefin is isotactic polyethylene.

7. The composition of claim 6 wherein said isotactic polyethylene is a high density polyethylene.

8. The composition of claim 1 wherein said thermoplastic elastomer is a hydrogenated diblock copolymer consisting essentially of from about 20% to about 70% by weight of a hydrogenated block of polybutadiene and from about 30% to about 80% by weight of a hydrogenated block of a random copolymer of a vinyl arene and 1,3-butadiene containing from about 5% to about 50% by weight of vinyl arene and from about 50% to about 95% by weight of butadiene, said hydrogenated diblock copolymer having a residual unsaturation content of less than 20% of the original unsaturation level prior to hydrogenation.

9. The composition of claim 8 wherein said vinyl arene is styrene.

10. The composition of claim 8 wherein said polybutadiene had a 1,2-microstructure content of less than 30% prior to hydrogenation and the butadiene portion of said random copolymer had a 1,2-microstructure content of from 5 to 50% prior to hydrogenation.

11. The composition of claim 1 wherein said thermoplastic elastomer is a hydrogenated diblock copolymer containing 25% to 40% by weight of a hydrogenated block of polybutadiene having a 1,2-microstructure content of 8% to 16% prior to hydrogenation and 65% to 75% by weight of a hydrogenated block of a random copolymer of butadiene/styrene containing 55% to 75% of butadiene and 25% to 45% of styrene with the butadiene portion of the random copolymer having a 1,2-microstructure content of 10% to 25% prior to hydrogenation.

* * * * *